United States Patent
Niaura

(10) Patent No.: US 12,337,627 B2
(45) Date of Patent: Jun. 24, 2025

(54) METAL WEB FOR A NON-PNEUMATIC TIRE AND METHOD OF MAKING SAME

(71) Applicant: Bridgestone Americas Tire Operations, LLC, Nashville, TN (US)

(72) Inventor: William S. Niaura, Mesa, AZ (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 1059 days.

(21) Appl. No.: 17/298,708

(22) PCT Filed: Dec. 19, 2019

(86) PCT No.: PCT/US2019/067392
§ 371 (c)(1),
(2) Date: Jun. 1, 2021

(87) PCT Pub. No.: WO2020/139682
PCT Pub. Date: Jul. 2, 2020

(65) Prior Publication Data
US 2022/0048324 A1    Feb. 17, 2022

Related U.S. Application Data

(60) Provisional application No. 62/785,804, filed on Dec. 28, 2018.

(51) Int. Cl.
*B60C 7/14*    (2006.01)
*B60C 7/06*    (2006.01)
*B60C 7/20*    (2006.01)

(52) U.S. Cl.
CPC ............. *B60C 7/143* (2013.01); *B60C 7/06* (2013.01); *B60C 7/146* (2021.08); *B60C 7/20* (2013.01); *Y10T 29/49538* (2015.01)

(58) Field of Classification Search
CPC ........... B60C 7/06; B60C 7/143; B60C 7/146; B60C 7/18; B60C 7/20; Y10T 29/49538; B29D 30/02
See application file for complete search history.

(56) References Cited

U.S. PATENT DOCUMENTS

| 495,218 | A | * | 4/1893 | Coe | ........................... B60C 7/14 267/164 |
| 667,348 | A | * | 2/1901 | Starr | ........................ B60C 7/24 152/393 |

(Continued)

FOREIGN PATENT DOCUMENTS

| AU | 743976 | 7/2000 |
| CN | 1400115 | 3/2003 |

(Continued)

OTHER PUBLICATIONS

Brickham Stamping Co., Inc, Spring Steel, Nov. 1, 2018, https://web.archive.org/web/20181101102523/https://brickhamstamping.com/our-materials/spring-steel/ (Year: 2018).*

(Continued)

*Primary Examiner* — Kip T Kotter
(74) *Attorney, Agent, or Firm* — Shaun J. Fox; Bryan J. Jaketic

(57) ABSTRACT

A web structure for a non-pneumatic tire includes a first corrugated ring having a first plurality of peaks and a first plurality of valleys. The first corrugated ring is a metal ring. The web structure further includes a second corrugated ring having a second plurality of peaks and a second plurality of valleys. The second corrugated ring is a metal ring. The second plurality of valleys are affixed to the first plurality of peaks by brazing or welding.

14 Claims, 9 Drawing Sheets

(56) References Cited

U.S. PATENT DOCUMENTS

| | | | | |
|---|---|---|---|---|
| 767,949 | A | * 8/1904 | Lutz | ............ B60C 7/121 |
| | | | | 152/314 |
| 1,259,256 | A | * 3/1918 | Maillard | ............ B60C 7/121 |
| | | | | 152/315 |
| 1,389,285 | A | * 8/1921 | Althoff | ............ B60C 7/14 |
| | | | | 152/20 |
| 4,477,089 | A | 10/1984 | Hoffman et al. | |
| 5,494,090 | A | 2/1996 | Kejha | |
| 9,487,052 | B1 | 11/2016 | Asper | |
| 2012/0241062 | A1 | 9/2012 | Manesh et al. | |
| 2018/0001704 | A1 | 1/2018 | Reinhardt | |
| 2018/0029419 | A1 | 2/2018 | Kim et al. | |
| 2018/0172061 | A1 | 6/2018 | Ochiai | |

FOREIGN PATENT DOCUMENTS

| | | | |
|---|---|---|---|
| CN | 103481731 | | 1/2014 |
| CN | 105109279 | | 12/2015 |
| CN | 105730149 | | 7/2016 |
| CN | 105856971 | | 8/2016 |
| CN | 105109279 B | * | 11/2017 |
| CN | 107933199 | | 4/2018 |
| CN | 108472888 | | 8/2018 |
| JP | 2012187982 | | 10/2012 |
| JP | 2016113105 | | 6/2016 |
| WO | 2007057975 | | 5/2007 |
| WO | 2018115941 | | 1/2018 |
| WO | 2018200142 | | 11/2018 |

OTHER PUBLICATIONS

Supplementary European Search Report; Corresponding EP Application Serial No. 19903640; Sep. 8, 2022.

U.S. Pat. No. 772,609; Oct. 18, 1904; Hart, Marie (unable to enter in USP Section).

Lu Zhi Zheng Chao et al.; Design and Manufacture of Super-Hard Material Tools; Beijing, Metallurgical Industry Press; 2010.

Lu Zhi Zheng Chao et al.; Design and Manufacture of Super-Hard Material Tools; Beijing, Metallurgical Industry Press; 2010 (English Translation).

International Search Report and Written Opinion; Corresponding PCT Application No. PCT/US2019/067392; Authorized Officer Hwang, Chan Yoon; Apr. 17, 2020.

Ma, Jianfeng et al.; Dynamic Impact Simulation of Interaction between Non-Pneumatic Tire and Sand with Obstacle; Abstract; SAE 2011 World Congress & Exhibition; Apr. 12, 2011.

Meng, Fanhao et al.; Flexible Cellular Structures of a Non-Pneumatic Tire; Abstract; https://asmedigitalcollection.asme.org/IDETC-CIE/proceedings-abstract/IDETC-CIE2016/50152/V05AT07A005/251571; Dec. 5, 2016.

Garlitos, Kirby; NASA Finally has Tires Suitable for the Moon, Mars, and Beyond; Top Speed; Nov. 23, 2017.

* cited by examiner

METAL WEB FOR A NON-PNEUMATIC TIRE AND METHOD OF MAKING SAME

FIELD OF INVENTION

The present disclosure relates to a web structure for a non-pneumatic tire, and a method of making the same. More particularly, the present disclosure relates to a method of making a web structure by pre-forming elongated steel sheets into web layers.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring.

The spokes or webbing may be made by a molding process. In some embodiments, the spokes or webbing are molded as a single, unitary piece. In other embodiments, multiple rings are molded and then axially joined to form the spoke or webbing structure. In still other embodiments, circular sectors are molded and then circumferentially joined to form the spoke or webbing structure.

SUMMARY OF THE INVENTION

In one embodiment, a method of making a non-pneumatic tire is described. The method includes providing a first elongated sheet of spring steel material, corrugating the first elongated sheet of spring steel material to form a first plurality of peaks and a first plurality of valleys in the first elongated sheet of spring steel material, bending the first elongated sheet of spring steel material into a first annular shape, thereby forming a first webbing ring, and heat treating the first webbing ring and quenching the first webbing ring in an oil bath. The method further includes providing a second elongated sheet of spring steel material, corrugating the second elongated sheet of spring steel material to form a second plurality of peaks and a second plurality of valleys in the second elongated sheet of spring steel material, bending the second elongated sheet of spring steel material into a second annular shape, thereby forming a second webbing ring, and heat treating the second webbing ring and quenching the second webbing ring in an oil bath. The method also includes affixing the first plurality of peaks of the first elongated sheet of spring steel material to the second plurality of valleys of the second elongated sheet of spring steel material, providing an inner ring of spring steel material, affixing the inner ring of spring steel material to the first plurality of valleys of the first elongated sheet of spring steel material, providing an outer ring of spring steel material, connecting the outer ring of spring steel material to the second elongated sheet of spring steel material, providing tread rubber, and affixing the tread rubber to the outer ring of spring steel material.

In another embodiment, a web structure for a non-pneumatic tire is described. The web structure includes a first corrugated ring having a first plurality of peaks and a first plurality of valleys, wherein the first corrugated ring is a press formed metal ring, and a second corrugated ring having a second plurality of peaks and a second plurality of valleys, wherein the second corrugated ring is a metal ring, and wherein the second plurality of valleys are affixed to the first plurality of peaks by vacuum brazing.

In yet another embodiment, a method of making a web structure for a non-pneumatic tire is described. The method includes providing a first elongated sheet of metal material having a first length in a longitudinal direction, and a first width in a lateral direction, the first length being greater than the first width, forming a first plurality of peaks and a first plurality of valleys in the first elongated sheet of metal material, bending the first elongated sheet of metal material into a first annular shape, thereby forming a first webbing ring, and heat treating the first webbing ring. The method further includes providing a second elongated sheet of metal material having a second length in a longitudinal direction, and a second width in a lateral direction, the second length being greater than the second width, wherein the second length is greater than the first length, and wherein the second width is equal to the first width, forming a second plurality of peaks and a second plurality of valleys in the second elongated sheet of metal material, bending the second elongated sheet of metal material into a second annular shape, thereby forming a second webbing ring, and heat treating the second webbing ring. The method also includes affixing the first plurality of peaks of the first elongated sheet of metal material to the second plurality of valleys of the second elongated sheet of metal material, thereby forming a first web assembly.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
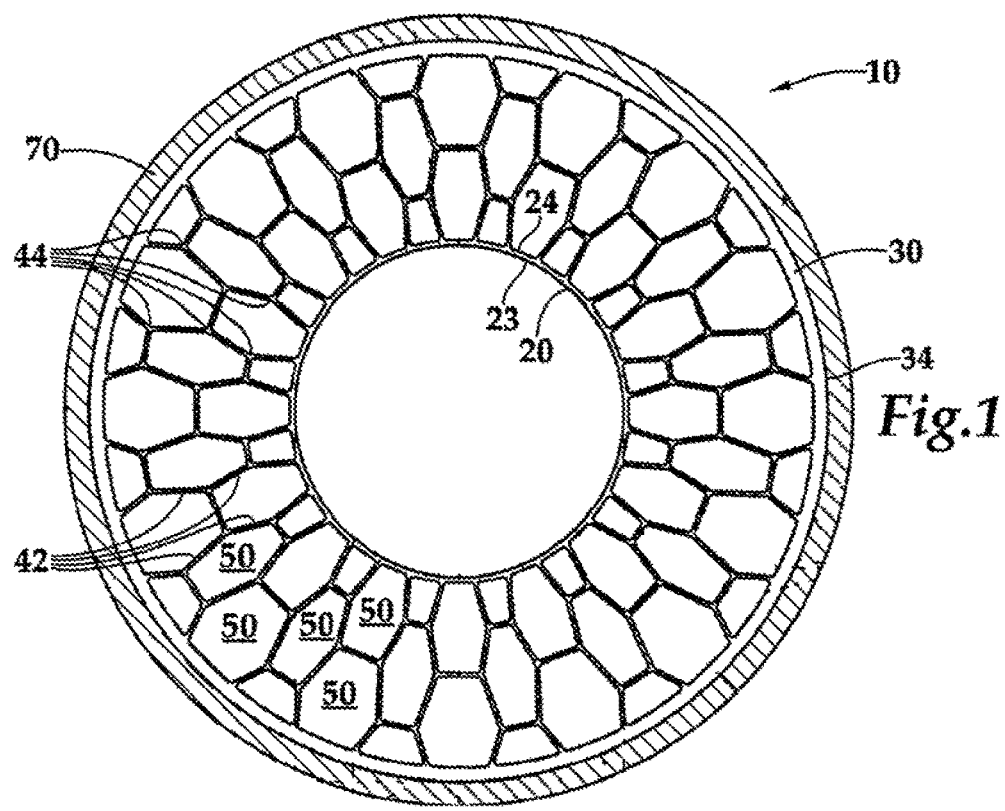
FIG. 1 is a front view of an undeformed non-pneumatic tire.
Figure 2:
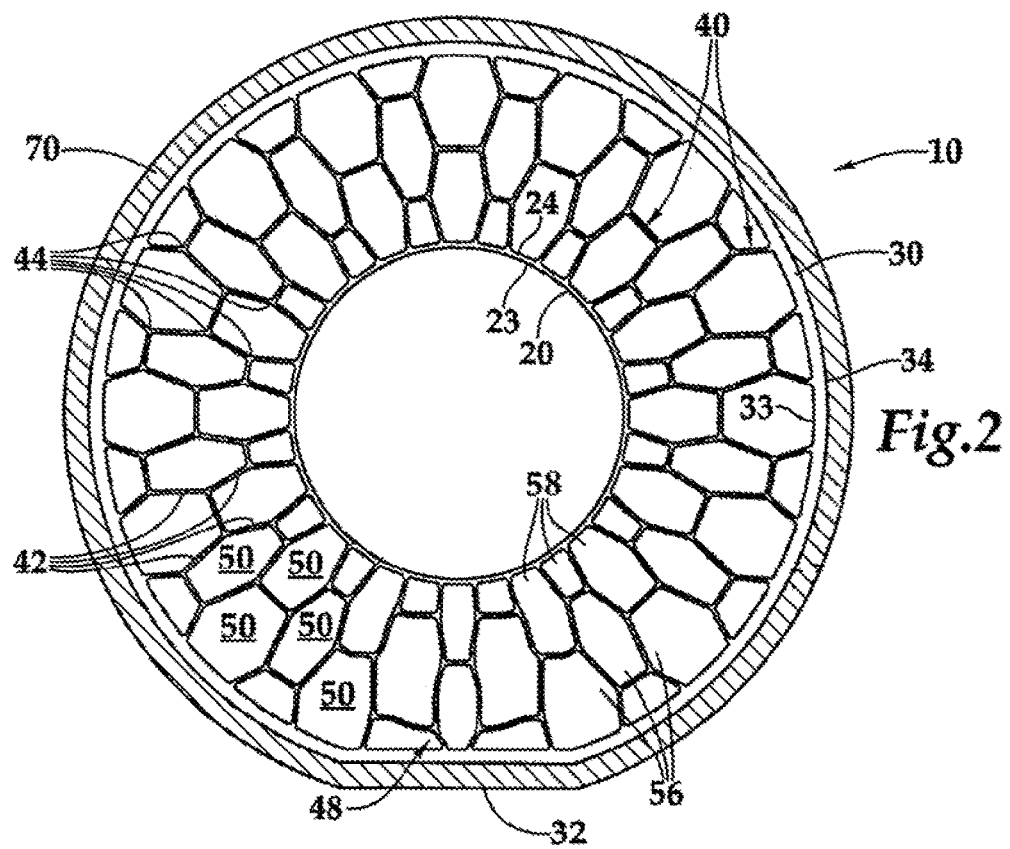
FIG. 2 is a front view of the non-pneumatic tire of FIG. 1 being deformed when subjected to a load.

FIGS. 1 and 2 illustrate one embodiment of a non-pneumatic tire 10.

The non-pneumatic tire 10 is merely an exemplary illustration and is not intended to be limiting. In the illustrated embodiment, the non-pneumatic tire 10 includes a generally annular inner ring 20 that engages a rim (not shown) to which the tire 10 is mounted. The generally annular inner ring 20 has an internal surface 23 and an external surface 24 and can be made of metal. In one embodiment, the generally annular inner ring 20 can me made of annealed spring steel.

The non-pneumatic tire 10 further includes a generally annular outer ring 30 surrounding an interconnected web 40, which is a support structure connected to the generally annular inner ring 20. In alternative embodiments, a plurality of spokes or other support structure connects the inner ring to the outer ring. The outer ring 30 can be configured to deform in an area 48 around and including a footprint region 32 (see FIG. 2), which decreases vibration and increases ride comfort.

In one embodiment, the generally annular inner ring 20 and the generally annular outer ring 30 are made of the same material as interconnected web 40. As shown in FIG. 1, the generally annular outer ring 30 can have a radially external surface 34 to which a tread carrying layer 70 is attached. Attachment can be done adhesively, through mechanical interlocking, friction fits or using other methods commonly available in the art.

In the illustrated embodiment, the interconnected web 40 has at least two radially adjacent layers 56, 58 of web elements 42 that define a plurality of generally polygonal openings 50. In other embodiments (not shown), other web configurations may be employed. In another embodiment (not shown), spokes or other support structure may be employed instead of a web.

Figure 3:
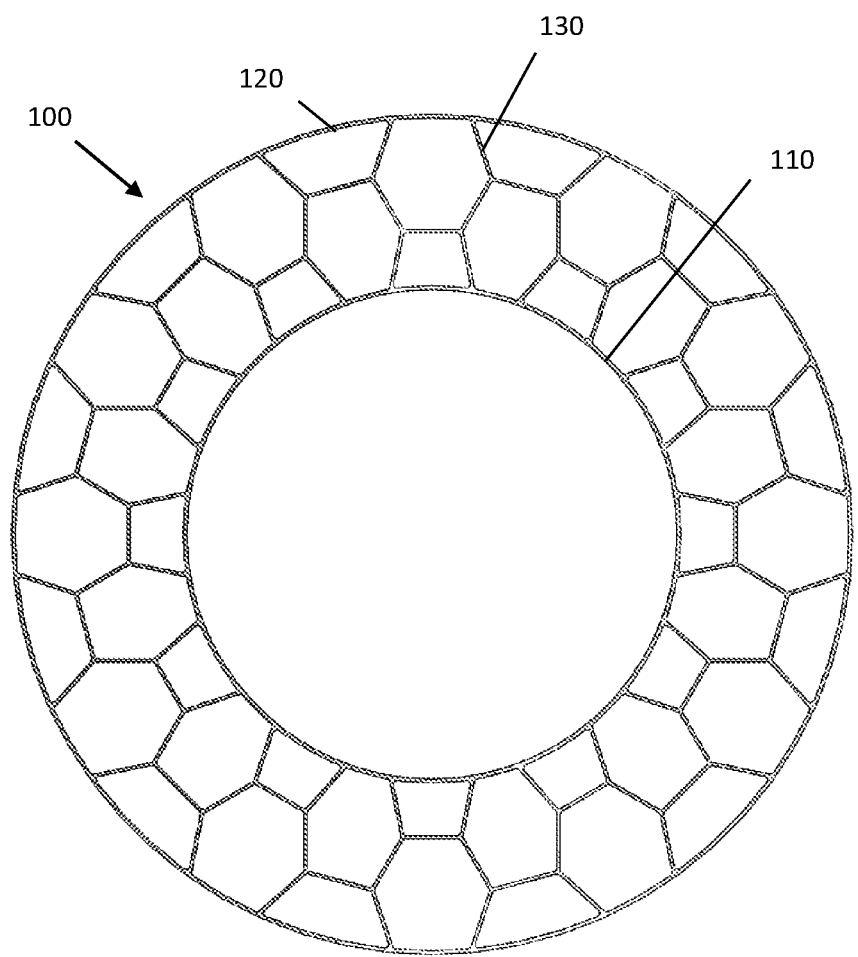
FIG. 3 is a front view of another embodiment of an undeformed non-pneumatic tire.

FIG. 3 illustrates a front view of another embodiment of a tire 100 having a generally annular inner ring 110, a generally annular outer ring 120, and support structure in the form of an interconnected web extending between the inner ring 110 and the outer ring 120. The interconnected web is formed by a plurality of web elements 130 that define polygonal openings. In this particular embodiment, the web elements 130 form a plurality of hexagonal and substantially trapezoidal shapes, including an outer series of alternating hexagonal and trapezoidal opening and an inner series of alternating hexagonal and trapezoidal openings. It should be understood that the geometries shown in FIGS. 1-3 are merely exemplary and that any geometries may be employed. Similarly, spokes or other support structure may be employed instead of a webbing.

Figure 4A:
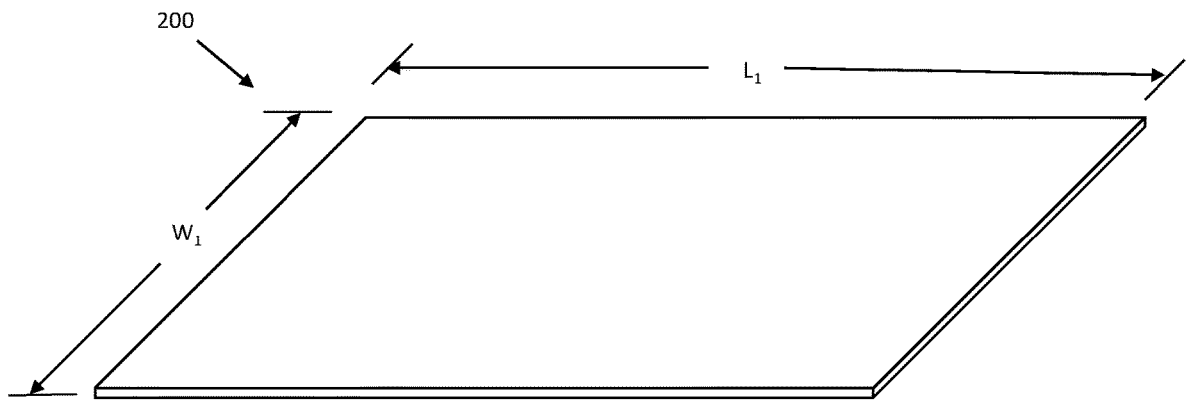
FIG. 4A is a schematic drawing illustrating a perspective view of one embodiment of a sheet of metal material.

FIG. 4A is a schematic drawing illustrating a perspective view of one embodiment of a sheet 200 of metal. The sheet 200 has a first length $L_1$ in a longitudinal direction, and a first width $W_1$ in a lateral direction, the first width $W_1$ being equal to the full width of the wheel. The first length $L_1$ is greater than the first width $W_2$. Thus, the sheet 200 may be referred to as an elongated sheet.

In one embodiment, the sheet 200 is a spring steel strip. Spring steel exhibits desirable high yield strength allowing an object made of spring steel to return to its original shape without deformation.

Figure 4B:
FIG. 4B is a schematic drawing illustrating a side view of the sheet of metal material.
Figure 4C:
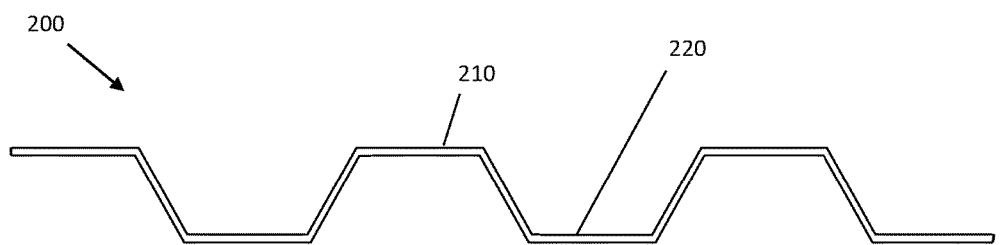
FIG. 4C is a schematic drawing illustrating a side view of the sheet of metal material having a plurality of peaks and valleys formed therein.

FIG. 4B is a schematic drawing illustrating a side view of the sheet 200 of metal material. While the sheet 200 is depicted as a single, flat sheet, it may be provided in a roll of material that is cut to the desired size. FIG. 4C is a schematic drawing illustrating a side view of the sheet 200 of metal material after a shaping process. The sheet 200 of metal material is shaped into a corrugated strip with a first plurality of peaks 210 and a first plurality of valleys 220. In the illustrated embodiment, three peaks 210 and three valleys 220 are shown, with each peak having the same height and the same geometry formed by defined angles. The geometry may be described as an open trapezoid or half-hexagon. In other embodiments, any number of peaks and valleys may be employed. The peaks and valleys may be curved or rounded, or have any geometric shape. Additionally, the peaks and valleys may vary in height.

In the illustrated embodiment, the first plurality of peaks 210 and the first plurality of valleys 220 extend in the lateral direction. In an alternative embodiment, the first plurality of peaks and the first plurality of valleys may extend in the longitudinal direction. In another alternative embodiment, the first plurality of valleys may extend at an acute angle with respect to the longitudinal direction.

In one embodiment, peaks and valleys are formed in the sheet through a press form process. In other words, the peaks and valleys may be formed by a press brake. However, the peaks and valleys may be formed through other bending or forming process, such as stamping or rolling.

In one embodiment, the process of forming peaks and valleys is performed on a discrete sheet of material. In an alternative embodiment, the process of forming peaks and valleys is performed on a material that is later cut into discrete sheets. In such an embodiment, the material may be provided as a roll of material.

Figure 5:
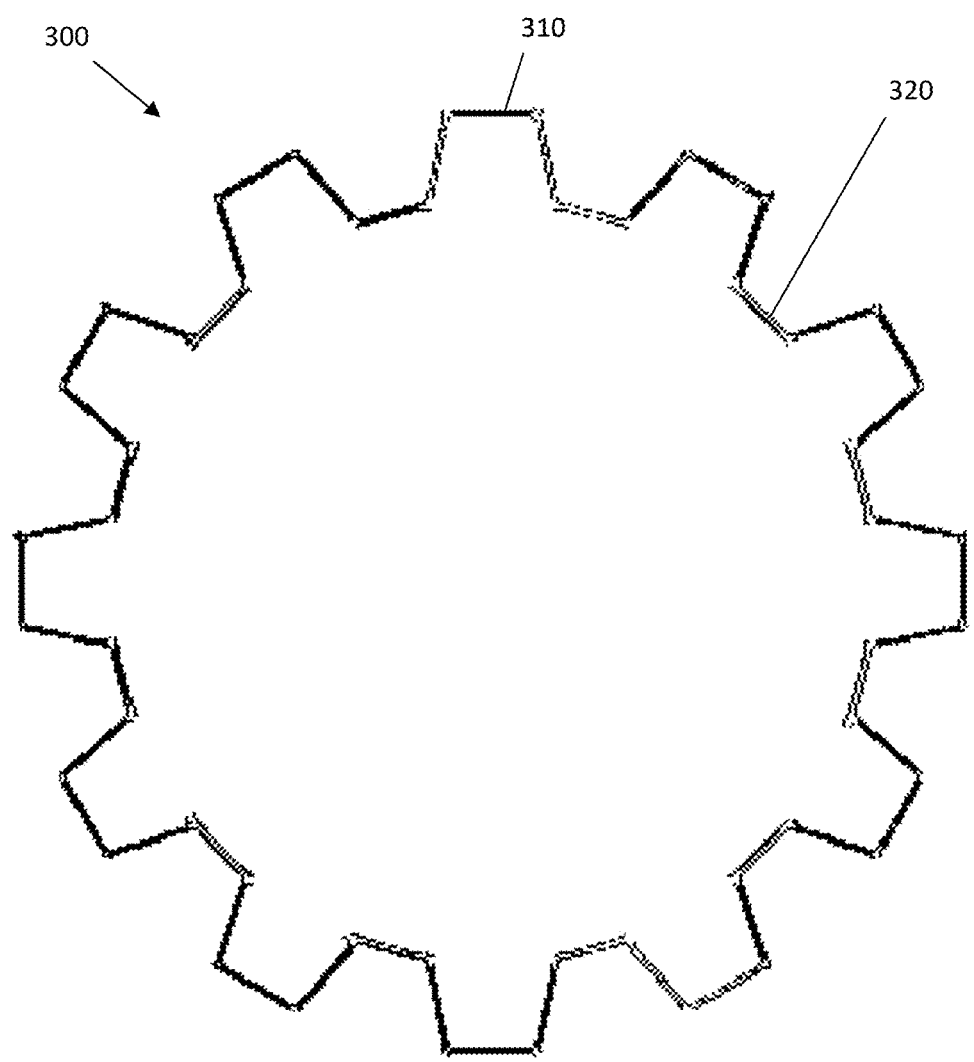
FIG. 5 is a schematic drawing illustrating a side view of one embodiment of a webbing ring having a plurality of peaks and valleys formed therein.

After the peaks 210 and valleys 220 are formed, the sheet 200 of metal material is bent into a first annular shape, thereby forming a first webbing ring 300. FIG. 5 is a schematic drawing illustrating a side view of one embodiment of a first webbing ring 300 having a plurality of peaks 310 and valleys 320. It should be understood that the shape and size of the peaks and valleys may vary in the same ways discussed above with respect to FIG. 4C.

In one embodiment, the first webbing ring 300 is formed from a single sheet 200 of material. After the single sheet 200 is bent into an annular shape, the ends of the sheet are attached to each other. The ends may be attached using a welding or brazing process. The ends may also be attached through mechanical means, such as by forming a first end into a hook and a second end into a loop, or by using rivets, staples, or other mechanical fastening means.

In an alternative embodiment, the first webbing ring 300 is formed by a plurality of sheets. Each sheet may be bent into a partial annular shape, and a plurality of bent sheets are joined in a circumferential direction to form the first webbing ring 300. In such an embodiment, the ends may be attached to each other in the same manners described above.

Figure 6:
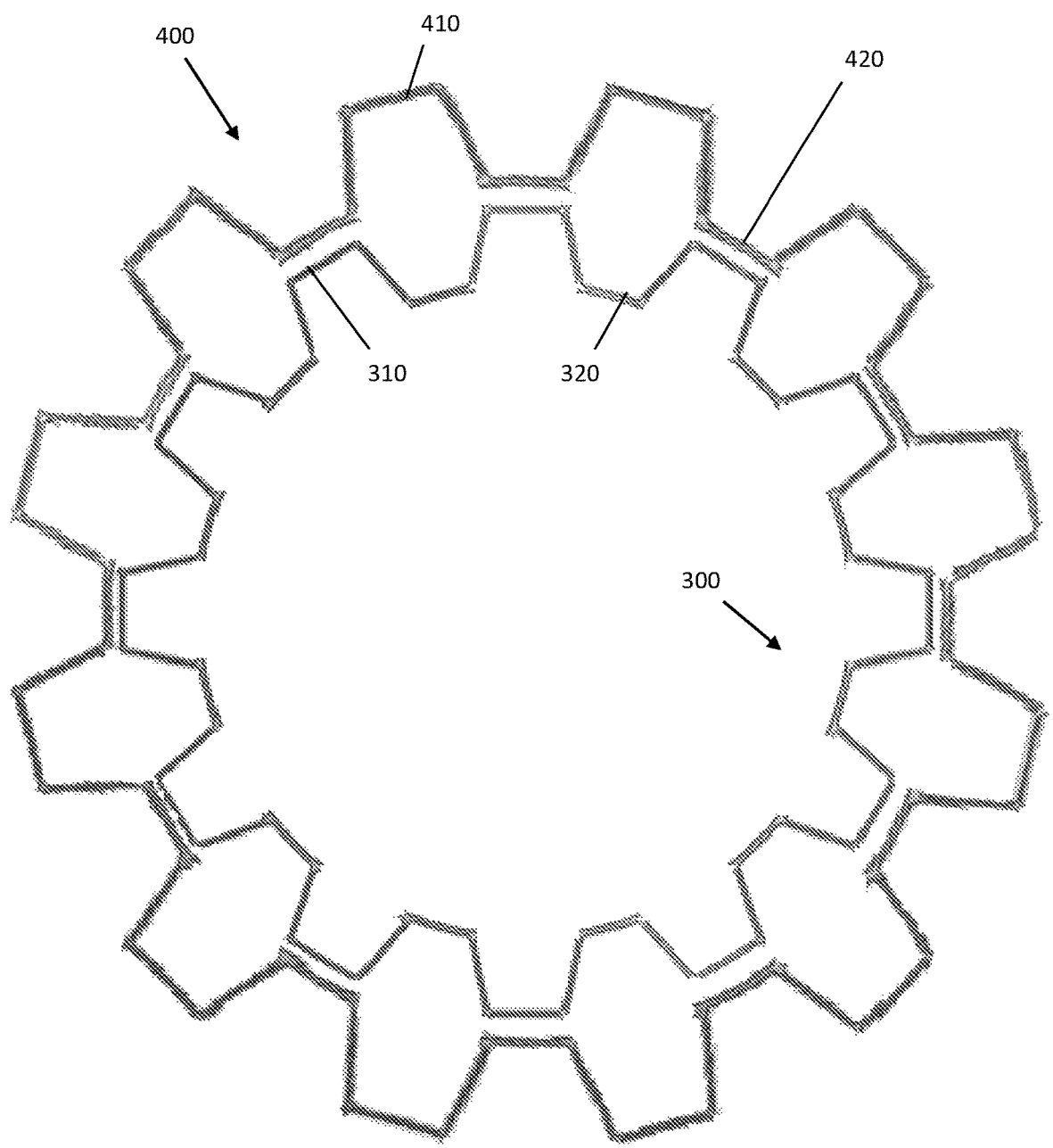
FIG. 6 is a schematic drawing illustrating a side view of one embodiment of a first webbing ring attached to a second webbing ring.

After the first webbing ring 300 is formed, the metal material is heat treated to achieve desired annealed spring steel properties. In one embodiment, the metal material is heat treated to 900° C. In alternative embodiments, the metal material is heat treated to a temperature between 700° C. and 1000° C. The heat treated metal material is subsequently quenched in an oil bath. ASTM 5160 produces a 669 MPc yield while an ASTM 1074 or ASTM 1075 produces a 430-530 Mpc yield. After the first webbing ring 300 is formed and heat treated, a second webbing ring 400 is formed and attached to the first webbing ring 300. FIG. 6 is a schematic drawing illustrating a side view of one embodiment of a first webbing ring 300 attached to a second webbing ring 400. The rings are spaced apart for illustrative purposes. In the illustrated embodiment, the second webbing ring 400 has a larger diameter than the first webbing ring 300 and is therefore attached to the outside of the first webbing ring. However, the second webbing ring may have a smaller diameter than the first webbing ring 300, and may be attached to the inside of the first webbing ring.

In the illustrated embodiment, the second webbing ring 400 has a second plurality of peaks 410 and a second plurality of valleys 420. The number and shapes of the second plurality of peaks 410 and second plurality of valleys 420 correspond to the number and shapes of the first plurality of peaks 310 and first plurality of valleys 320, such that the first plurality of peaks 310 can be attached to the second plurality of valleys 420.

Figure 7:
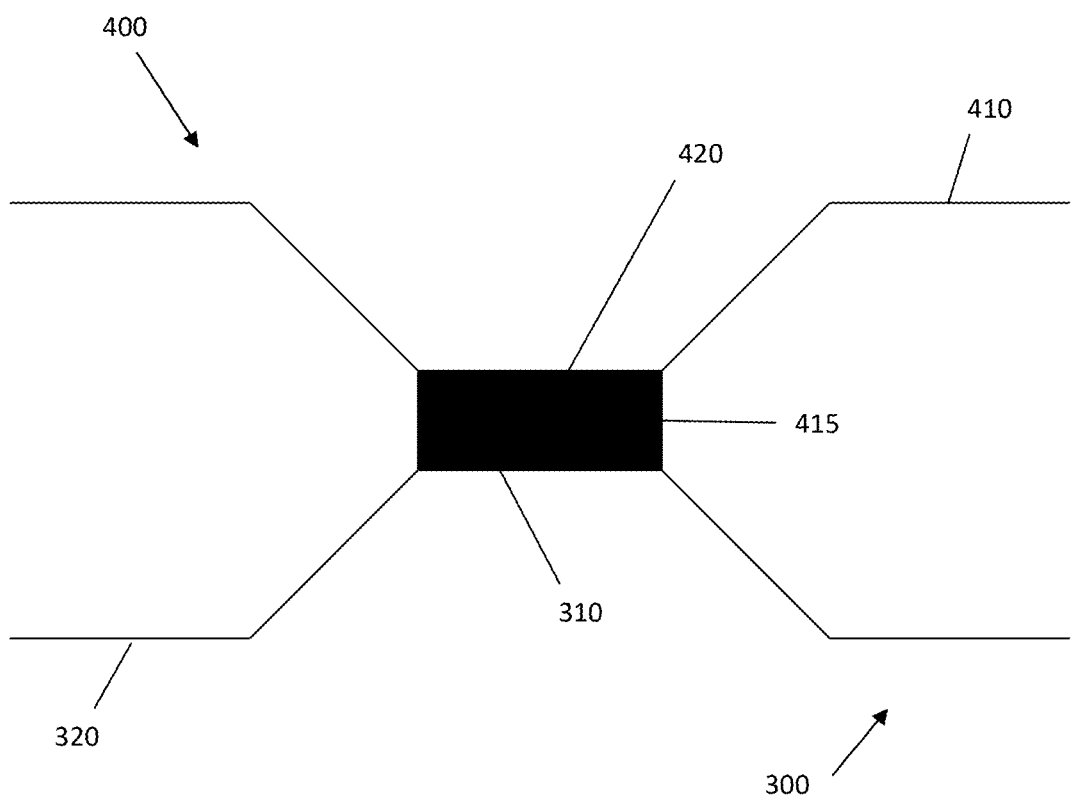
FIG. 7 is an enlarged schematic drawing illustrating a side view of a single contact point of a first embodiment of a webbing ring attached to a second webbing ring.

FIG. 7 is an enlarged schematic drawing illustrating a side view of a single contact of a first embodiment of a webbing ring attached to a second webbing ring. The first plurality of peaks 310 and the second plurality of valleys 420 may be attached using vacuum brazing 415 along the joint. The vacuum brazing 415 is performed at a temperature between 350-550. In one specific embodiment, the vacuum brazing 415 is performed at a temperature of 450° C. The vacuum brazing 415 will not anneal the heat treatment previously performed. The vacuum brazing 415 is more fatigue resistant than welding and will flow to naturally form a fillet that further reduces the stress concentrations at the vertices. Additionally, vacuum brazing achieves bonding at a temperature range that does not disrupt the spring-steel qualities. Alternatively, the peaks and valleys may be attached by welding. The peaks and valleys may also be attached with rivets, staples, or other mechanical fastening means. In such embodiments, the first plurality of peaks 310 are directly connected to the second plurality of valleys 420. In another embodiment, a brazing technology that is capable of producing fillets is used to attach the first plurality of peaks 310 and the second plurality of valleys 420 along the joint.

In one embodiment, the second webbing ring 400 is constructed of the same material as the first webbing ring 300. In such an embodiment, a second elongated sheet of spring steel material is provided, and a second plurality of peaks and valleys are formed therein. The second sheet may have a greater length than the first sheet, and the same width as the first sheet. The first and second sheets may be provided as separate, discrete sheets, or they may be cut from a single elongated sheet. In such an embodiment, the first and second sheets may be cut before or after the peaks and valleys are formed. In another embodiment, the second webbing ring 400 is constructed of the same material as the first webbing ring 300 but a different thickness. In another embodiment, the second webbing ring 400 is constructed of a different grade of steel than the first webbing ring 300.

In one embodiment, a height of the second plurality of peaks 410 is substantially equal to a height of the second plurality of valleys 420. In an alternative embodiment, the heights of the peaks and valleys may vary. After the second sheet is provided and the peaks and valleys are formed, the second sheet, or a plurality of second sheets are then formed into an annular ring shape.

Figure 8:
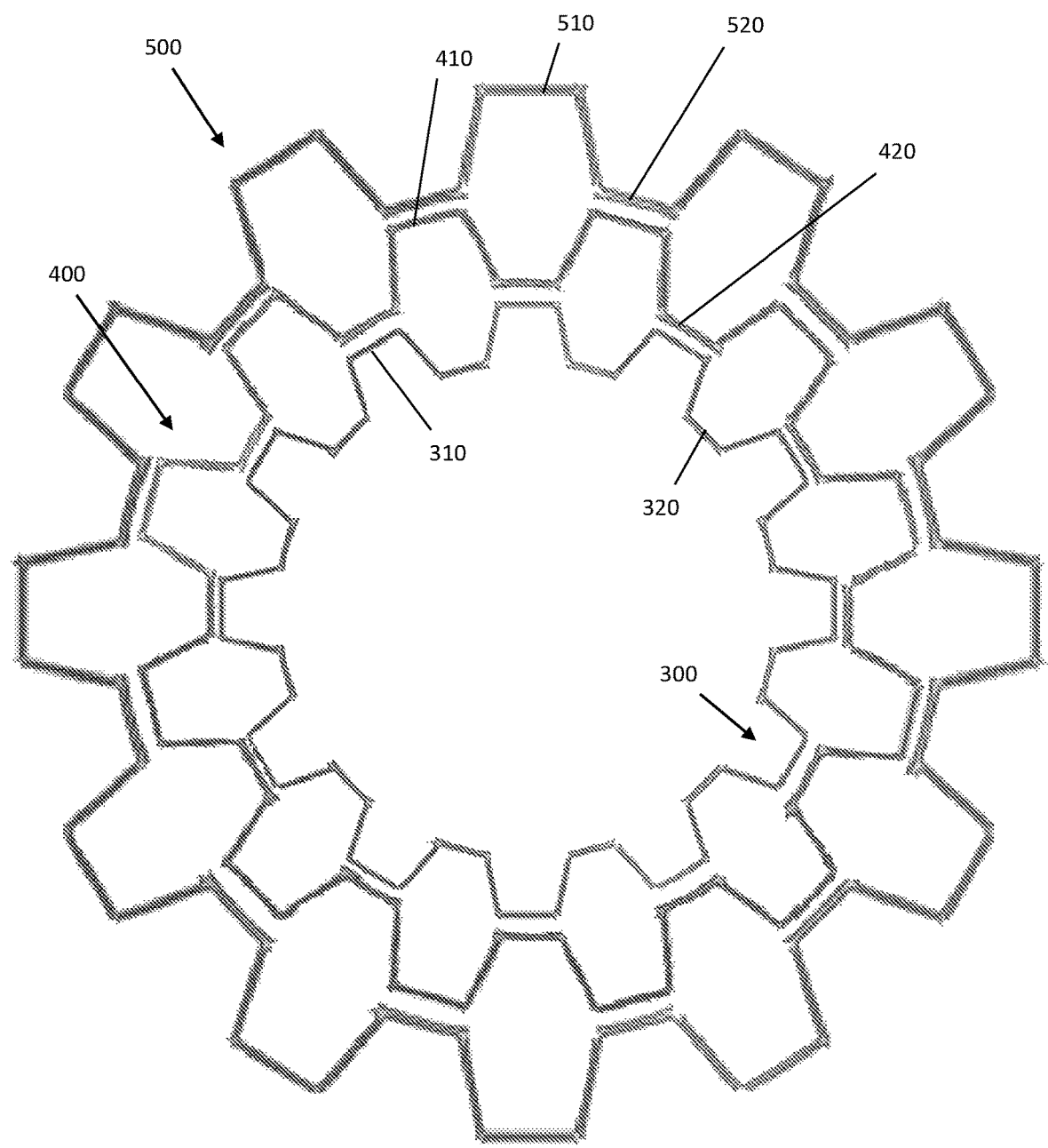
FIG. 8 is a schematic drawing illustrating a side view of one embodiment of a first webbing ring attached to a second webbing ring, which is attached to a third webbing ring.

After the first webbing ring 300 is connected to the second webbing ring 400, a third webbing ring 500 is formed and attached to the second webbing ring 400. In another embodiment, each webbing ring can be formed and all rings could be simultaneously assembled using a clamping or other fixturing mechanism. FIG. 8 is a schematic drawing illustrating a side view of one embodiment of a first webbing ring 300 attached to a second webbing ring 400, which in turn is attached to a third webbing ring 500. The rings are spaced apart for illustrative purposes. In the illustrated embodiment, the third webbing ring 500 has a larger diameter than the second webbing ring 400 and is therefore attached to the outside of the second webbing ring. However, the third webbing ring may instead have a smaller diameter than the first webbing ring 300, and may be attached to the inside of the first webbing ring.

In the illustrated embodiment, the third webbing ring 500 has a third plurality of peaks 510 and a third plurality of valleys 520. The number and shapes of the third plurality of peaks 510 and third plurality of valleys 520 correspond to the number and shapes of the second plurality of peaks 410 and second plurality of valleys 420, such that the second plurality of peaks 410 can be attached to the third plurality of valleys 520. The second plurality of peaks 410 and the third plurality of valleys 520 may be attached using vacuum brazing along the joint.

Alternatively, the peaks and valleys may be attached by welding. The peaks and valleys may also be attached with rivets, staples, or other mechanical fastening means. In such embodiments, the first plurality of peaks 310 may be described as bring indirectly connected to the third plurality of valleys 520.

In one embodiment, the third webbing ring 500 is constructed of the same material as the first webbing ring 300 and the second webbing ring 400. In such an embodiment, a third elongated sheet of spring steel material is provided, and a third plurality of peaks and valleys are formed therein. The third sheet may have a greater length than the first sheet and the second sheet, and the same width as the first sheet and the second sheet. The first, second, and third sheets may be provided as separate, discrete sheets, or they may be cut from a single elongated sheet. In such an embodiment, the first, second, and third sheets may be cut before or after the peaks and valleys are formed. In another embodiment, the third webbing ring 500 is constructed of the same material as the first webbing ring 300 and the second webbing ring 400 but a different thickness. In another embodiment, the third webbing ring 500 is constructed of a different grade of steel than the first webbing ring 300 or the second webbing ring 400.

In one embodiment, a height of the third plurality of peaks 510 is substantially equal to a height of the third plurality of valleys 520. In an alternative embodiment, the heights of the peaks and valleys may vary. After the third sheet is provided and the peaks and valleys are formed, the third sheet, or a plurality of third sheets are then formed into an annular ring shape. The ends may be attached using a welding or brazing process.

In an alternative embodiment, the third webbing ring 500 is constructed of a different material from at least one of the first webbing ring 300 and the second webbing ring 400. The third webbing ring 500 may also have peaks and valleys of different shapes and sizes than those of the second webbing ring.

In another embodiment, after a desired number of webbing rings with peaks and valleys are connected to each other, the webbing rings can be dip coated in an elastomeric solution to provide a tailored amount of dampening and protects against corrosion.

Figure 9:
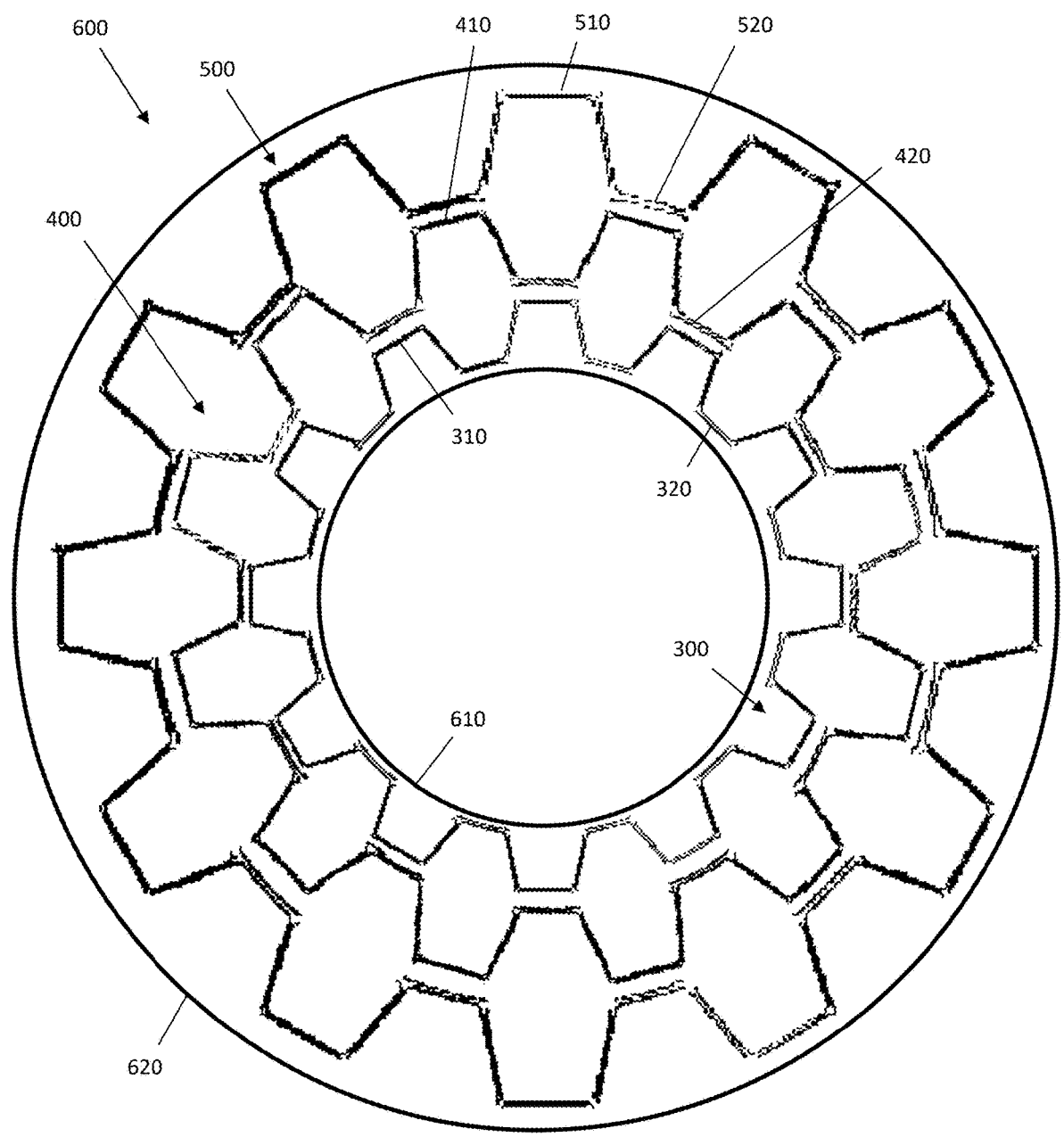
FIG. 9 is a schematic drawing illustrating a side view of one embodiment of a webbing assembly.

After the desired number of webbing rings with peaks and valleys are connected to each other, an inner ring is attached to the innermost webbing ring and an outer ring is attached to the outermost webbing ring. FIG. 9 is a schematic drawing illustrating a side view of one embodiment of such a webbing assembly 600. In this embodiment, the webbing assembly includes the first webbing ring 300, the second webbing ring 400, the third webbing ring 500, an inner ring 610, and an outer ring 620. The inner ring 610 and the outer ring 620 may be constructed of spring steel material. In one embodiment, the inner ring 610 and the outer ring 620 are constructed of the same material as the first webbing ring 300, the second webbing ring 400, and the third webbing ring 500. In an alternative embodiment, at least one of the inner ring 610 and the outer ring 620 is constructed of a different material from at least one of the first webbing ring 300, the second webbing ring 400, and the third webbing ring 500. In one embodiment, the at least one of the inner ring 610 and the outer ring 620 is an elastomeric material.

The first plurality of valleys 320 may be attached to the inner ring 610 using vacuum brazing 415 along the joint. Alternatively, the first plurality of valleys 320 may be attached to the inner ring 610 by welding. The first plurality of valleys 320 may also be attached to the inner ring 610 with rivets, staples, or other mechanical fastening means.

Likewise, the third plurality of peaks 510 may be attached to the outer ring 620 using vacuum brazing 415 along the joint. Alternatively, the third plurality of peaks 510 may be attached to the outer ring 620 by welding. The third plurality of peaks 510 may also be attached to the outer ring 620 with rivets, staples, or other mechanical fastening means.

In another embodiment, after the inner ring 610 and the outer ring 620 have been attached to the first plurality of valleys 320 and the third plurality of peaks 510, respectively, the webbing rings and inner 610 and outer ring 620 can be dip coated in an elastomeric solution to provide a tailored amount of dampening and protects against corrosion.

In the illustrated embodiment, the inner ring 610 is a smooth inner ring configured to be mounted to a hub. In alternative embodiments, the inner ring may have geometry configured to engage corresponding geometry of a hub. In another alternative embodiment, the first plurality of valleys 320 may be directly attached to a hub, through one of the attachment methods described above.

In the illustrated embodiment, the outer ring 620 is a smooth outer ring configured to receive tread rubber. In alternative embodiments, the outer ring may have geometry configured to engage corresponding geometry of a strip of tread rubber. In another alternative embodiment, the third plurality of peaks 510 may be directly attached to a strip of tread rubber.

While FIG. 9 illustrates a webbing structure 600 with an inner ring 610, an outer ring 620 and three webbing rings 300, 400, and 500, it should be understood that any number of these elements may be employed to form a webbing structure. In some instances, it may be desirable to construct a webbing structure with only one or two webbing rings. In other instances, it may be desirable to construct a webbing ring with four or more webbing rings.

It should also be understood that while an exemplary process for building the webbing structure 600 has been described herein, these steps may be performed in any order. Additionally, the webbing structure may be built by building a plurality of web sectors using the above described process, then attaching those web sectors circumferentially to form an annular web structure. Similarly, the webbing structure may be built by building a plurality of web structures and then affixing the webbing structures in an axial direction.

Figure 10:
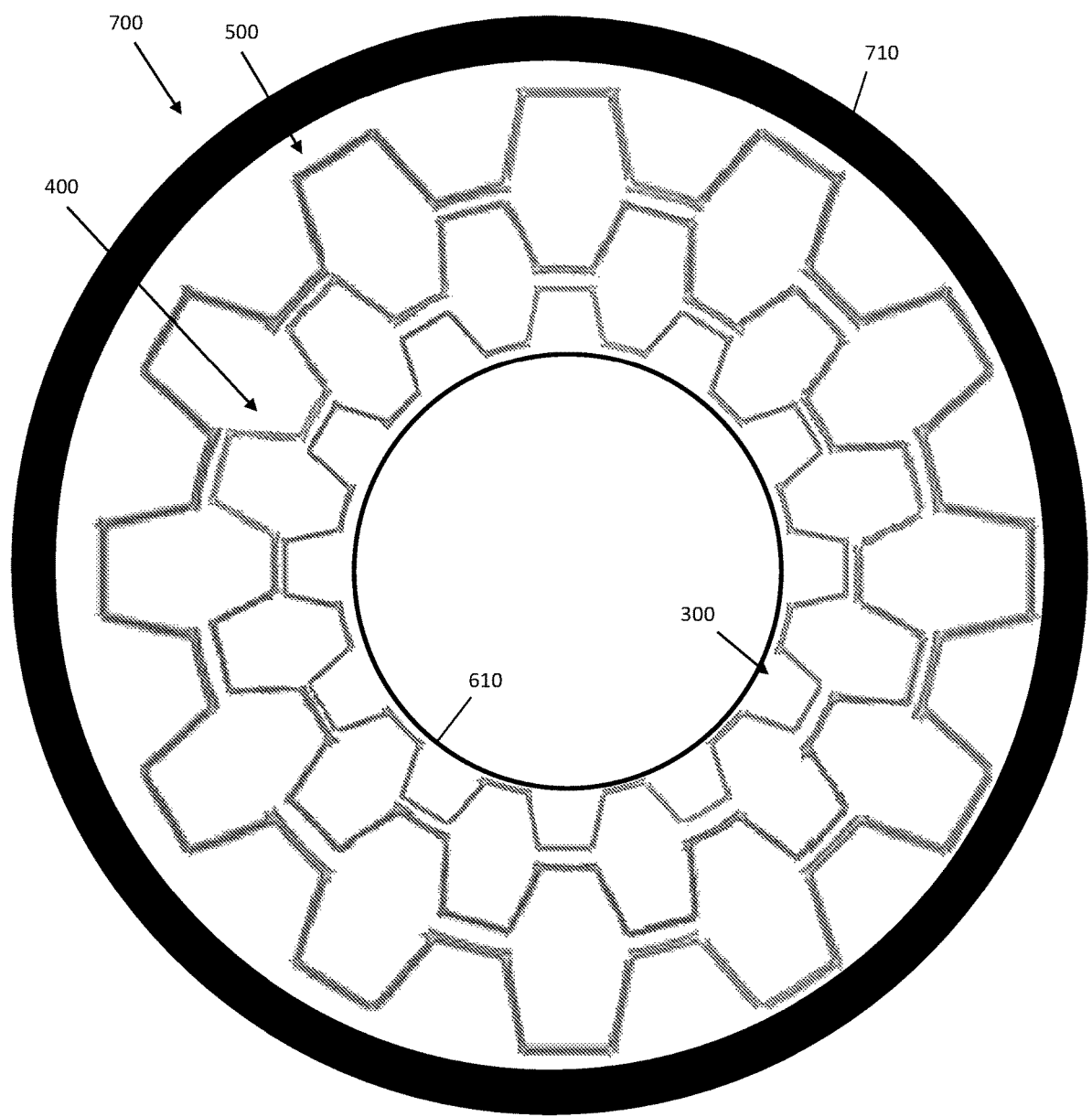
FIG. 10 is a schematic drawing illustrating a side view of one embodiment of a non-pneumatic tire.

After the webbing structure is built, a non-pneumatic tire may be completed by providing tread rubber and affixing the tread rubber to the outer ring of spring steel material. FIG. 10 is a schematic drawing illustrating a side view of one embodiment of a non-pneumatic tire 700. In the illustrated embodiment, the non-pneumatic tire 700 includes first, second, and third webbing rings 300, 400, 500, inner ring 610, and outer ring (not seen in this view). Tread rubber 710 is affixed to the outer ring. The tread rubber may be affixed with adhesive or a chemical bonding processing. The affixing may include an application of heat or pressure.

The tread rubber may have tread elements formed therein, such as ribs, blocks, lugs, grooves, sipes, and other tread elements. The tread rubber may also include internal structures, such as a shear band.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method of making a non-pneumatic tire, the method comprising:
   providing a first elongated sheet of spring steel material;
   corrugating the first elongated sheet of spring steel material to form a first plurality of peaks and a first plurality of valleys in the first elongated sheet of spring steel material;
   bending the first elongated sheet of spring steel material into a first annular shape, thereby forming a first webbing ring;
   heat treating the first webbing ring and quenching the first webbing ring in an oil bath;
   providing a second elongated sheet of spring steel material;
   corrugating the second elongated sheet of spring steel material to form a second plurality of peaks and a second plurality of valleys in the second elongated sheet of spring steel material;
   bending the second elongated sheet of spring steel material into a second annular shape, thereby forming a second webbing ring;
   heat treating the second webbing ring and quenching the second webbing ring in an oil bath;

affixing the first plurality of peaks of the first elongated sheet of spring steel material to the second plurality of valleys of the second elongated sheet of spring steel material;
providing an inner ring of spring steel material;
affixing the inner ring of spring steel material to the first plurality of valleys of the first elongated sheet of spring steel material;
providing an outer ring of spring steel material;
connecting the outer ring of spring steel material to the second elongated sheet of spring steel material;
providing tread rubber; and
affixing the tread rubber to the outer ring of spring steel material.

2. The method of claim 1, further comprising dip coating the first webbing ring, the second webbing ring, the inner ring of spring steel material, and the outer ring of spring steel material in an elastomeric solution.

3. The method of claim 1, wherein the connecting of the outer ring of spring steel material to the second elongated sheet of spring steel material includes directly connecting the outer ring of spring steel material to the second elongated sheet of spring steel material and includes affixing the outer ring of spring steel material to the second plurality of peaks of the second elongated sheet of spring steel material.

4. The method of claim 3, further comprising:
providing a third elongated sheet of spring steel material;
corrugating the third elongated sheet of spring steel material to form a third plurality of peaks and a third plurality of valleys in the third elongated sheet of spring steel material;
bending the third elongated sheet of spring steel material into a third annular shape, thereby forming a third webbing ring;
heat treating the third webbing ring and quenching the third webbing ring in an oil bath; and
affixing the second plurality of peaks of the second elongated sheet of spring steel material to the third plurality of valleys of the third elongated sheet of spring steel material.

5. The method of claim 1, wherein the connecting of the outer ring of spring steel material to the second elongated sheet of spring steel material includes indirectly connecting the outer ring of spring steel material to the second elongated sheet of spring steel material.

6. The method of claim 1, wherein providing of the first elongated sheet of spring steel material and providing of the second elongated sheet of spring steel material includes providing a single elongated sheet of spring steel material and cutting the single elongated sheet of spring steel material into the first elongated sheet of spring steel material and the second elongated sheet of spring steel material.

7. The method of claim 6, wherein the cutting of the single elongated sheet of spring steel material is performed after the corrugating of the first elongated sheet of spring steel material.

8. The method of claim 1, wherein the affixing of the first plurality of peaks of the first elongated sheet of spring steel material to the second plurality of valleys of the second elongated sheet of spring steel material includes vacuum brazing the first plurality of peaks of the first elongated sheet of spring steel material to the second plurality of valleys of the second elongated sheet of spring steel material.

9. The method of claim 1, wherein the affixing of the first plurality of peaks of the first elongated sheet of spring steel material to the second plurality of valleys of the second elongated sheet of spring steel material includes welding the first plurality of peaks of the first elongated sheet of spring steel material and the second plurality of valleys of the second elongated sheet of spring steel material.

10. A method of making a web structure for a non-pneumatic tire, the method comprising:
providing a first elongated sheet of metal material having a first length in a longitudinal direction, and a first width in a lateral direction, the first length being greater than the first width;
forming a first plurality of peaks and a first plurality of valleys in the first elongated sheet of metal material;
bending the first elongated sheet of metal material into a first annular shape, thereby forming a first webbing ring;
heat treating the first webbing ring;
providing a second elongated sheet of metal material having a second length in a longitudinal direction, and a second width in a lateral direction, the second length being greater than the second width,
wherein the second length is greater than the first length, and
wherein the second width is equal to the first width;
forming a second plurality of peaks and a second plurality of valleys in the second elongated sheet of metal material;
bending the second elongated sheet of metal material into a second annular shape, thereby forming a second webbing ring;
heat treating the second webbing ring;
affixing the first plurality of peaks of the first elongated sheet of metal material to the second plurality of valleys of the second elongated sheet of metal material, thereby forming a first web assembly.

11. The method of claim 10, wherein the forming of the first plurality of peaks and the first plurality of valleys in the first elongated sheet of metal material includes forming the first plurality of peaks and the first plurality of valleys in the lateral direction, and wherein the forming of the second plurality of peaks and the second plurality of valleys in the second elongated sheet of metal material includes forming the second plurality of peaks and the second plurality of valleys in the lateral direction.

12. The method of claim 10, further comprising forming a second web assembly and affixing the first web assembly to the second web assembly in an axial direction.

13. The method of claim 12, wherein the first web assembly is affixed to the second web assembly using vacuum brazing.

14. The method of claim 12, further comprising dip coating the first web assembly, and the second web assembly in an elastomeric solution.

* * * * *